US005377913A

United States Patent [19]

Van Der Woude

[11] Patent Number: 5,377,913

[45] Date of Patent: Jan. 3, 1995

[54] HYDRAULIC ROBOT JET LANCE

[76] Inventor: Meino J. Van Der Woude, Oude Slingeweg 2, NL-9204 WS Drachten, Netherlands

[21] Appl. No.: 90,037

[22] PCT Filed: Nov. 20, 1992

[86] PCT No.: PCT/NL92/00214

§ 371 Date: Jul. 16, 1993

§ 102(e) Date: Jul. 16, 1993

[87] PCT Pub. No.: WO93/09880

PCT Pub. Date: May 27, 1993

[30] Foreign Application Priority Data

Nov. 20, 1991 [NL] Netherlands ......................... 9101939

[51] Int. Cl.⁶ ........................... B05B 13/00; B25J 5/00

[52] U.S. Cl. .................................... 239/227; 239/265; 239/588; 901/43; 901/29; 165/95

[58] Field of Search ............... 239/227, 264, 265, 273, 239/280–281, 587.1, 588; 134/172; 901/1, 43, 15, 22, 29; 414/918; 188/170, 77 R, 76; 165/95

[56] References Cited

U.S. PATENT DOCUMENTS

| | | | |
|---|---|---|---|
| 3,214,033 | 10/1965 | Nilsson | 414/918 |
| 4,132,292 | 1/1979 | Dufresne | 188/75 |
| 4,370,836 | 1/1983 | Hockett | 901/29 |
| 4,690,327 | 9/1987 | Takai et al. | 239/227 |
| 4,693,664 | 9/1987 | Schweiker | 901/43 |
| 4,700,814 | 10/1987 | Mitchell | 188/170 |
| 4,767,257 | 8/1988 | Kato | 414/918 |
| 4,856,545 | 8/1989 | Krajicek et al. | 134/172 |
| 5,018,544 | 5/1991 | Boisture et al. | 134/111 |
| 5,167,720 | 12/1992 | Diamond et al. | 134/172 |

FOREIGN PATENT DOCUMENTS

| | | |
|---|---|---|
| 114424 | 8/1984 | European Pat. Off. . |
| 2250863 | 6/1975 | France . |
| 9015088 | 2/1991 | Germany . |

*Primary Examiner*—Karen B. Merritt

*Attorney, Agent, or Firm*—Mark Zovko

[57] ABSTRACT

A jet lance device comprising a hydraulic crane with an articulated jib movable by hydraulic motors, a hydraulic rotator mounted on the free end of the jib such that a rotatable support element thereof is turnable about an axis in the vertical plane through the jib, and a jet member mounted on the support element. This jet member comprises a jet lance which is pivotable on a pivot axis transverely of the rotation axis of the rotator and connectable to a source of jet liquid under high pressure, and the device further comprises controllers and drivers for operating the device.

5 Claims, 3 Drawing Sheets

HYDRAULIC ROBOT JET LANCE

The invention relates to a jet lance device. A jet lance device is generally used in industry for cleaning dirtied objects. A use is described in the earlier Netherlands patent application 91.01412 of applicant relating to a cleaning lance device for cleaning heat exchanger pipe bundles. This cleaning lance device is known for internal cleaning of the pipes of pipe bundles. The exterior of the pipes of pipe bundles must also be cleaned regularly and a high pressure jet lance device is likewise used for this purpose.

When operations take place with a jet lance handled by an operative no very high pressure can be used. The resulting forces would become too great to be manageable by the operative. In the case of objects that are complicated to clean, such as U-pipe bundles, the cleaning jet must however be held at so many different angles and in so many different positions to achieve a good result that manual operation is unavoidable.

The invention now has for its object to provide a jet lance device with which very complicated objects can also be properly cleaned at a very high pressure and thereby at great speed.

This object is achieved with a jet lance device as described subsequently. The hydraulic crane with the jet member pivotally supported by a rotator forms an industrial robot which can move the jet lance to all desired heights and in all desired directions. Objects for cleaning can be worked on from all sides and in all directions with the high pressure jet, thus enabling good cleaning. Work can take place with a very high pressure so that a very rapid action is obtained. An additional advantage is that the whole device can be remotely operated in the usual manner so that no operative has to be present in the vicinity of the high pressure jet. The risk of industrial accident is hereby markedly reduced.

The invention will be further elucidated in the following description of an embodiment as shown in the figures. Further features of the invention and the advantages obtained therewith will be found in this description.

Figure 1:
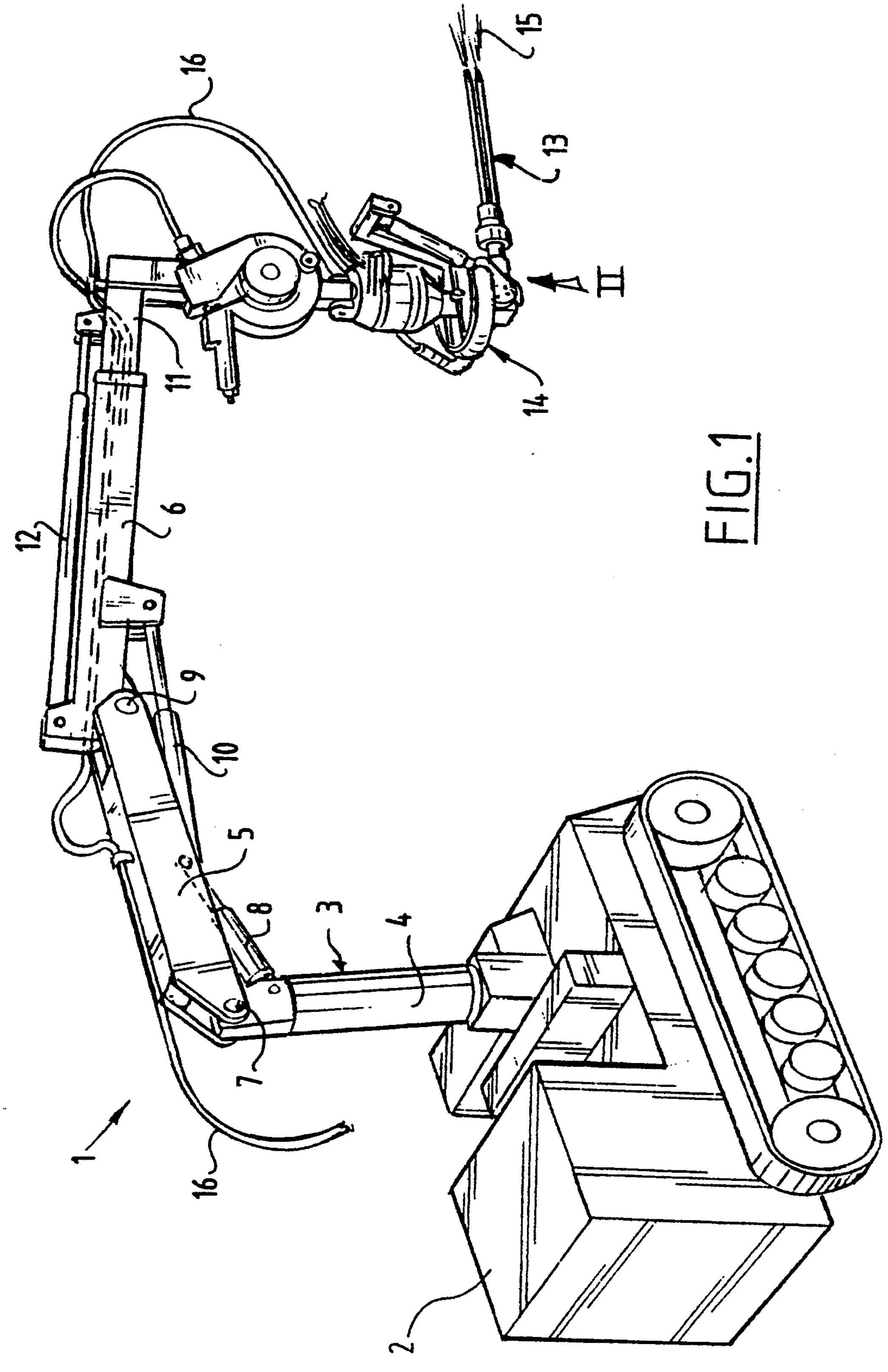
FIG. 1 shows a partly schematic perspective view of a hydraulic robot jet lance according to an embodiment of the invention.

The device 1 as shown in FIG. 1 comprises a hydraulic robot jet lance according to the invention mounted on a vehicle 2. This robot jet lance comprises a per se known hydraulic crane 3. The hydraulic crane 3 consists in this embodiment of a vertical column 4 rotatable on a vertical axis relative to vehicle 2. A first arm part or first jib 5 is connected to the column 4 at its top end by means of a hinge 7. The deflection of the first arm part or jib 5 relative to column 4 can be adjusted with a hydraulic jack 8. A second arm part or second jib 6 is arranged on the end of the first arm part or jib 5 by means of hinge 9. The angle of deflection of the second arm part or jib 6 relative to the first arm part or jib 5 is adjustable using a hydraulic jack 10.

The second arm part or jib 6 is provided with a telescopic slide member 11 which can be extended and retracted using the jack 12. Mounted on the end of slide member 11 is a head piece 14 which will be described with reference to FIG. 2–4. This head piece 14 bears on its bottom end the actual jet lance 13 which can generate liquid fed via a high pressure hose 16 under high pressure in a jet 15.

The hydraulic crane 3 with two arm parts or jibs 5, 6 shown in FIG. 1 is only one of many possible embodiments. Any suitable per se known hydraulic crane can be applied in the invention. It is only necessary that the position of the end of the arm can be placed in any desired position, of course within reach of the crane, by suitable control and drive means. Also, it can be said that the combination of first arm part or jib 5 and second arm part or jib 6 form what is well known as an articulated jib.

Figure 2:
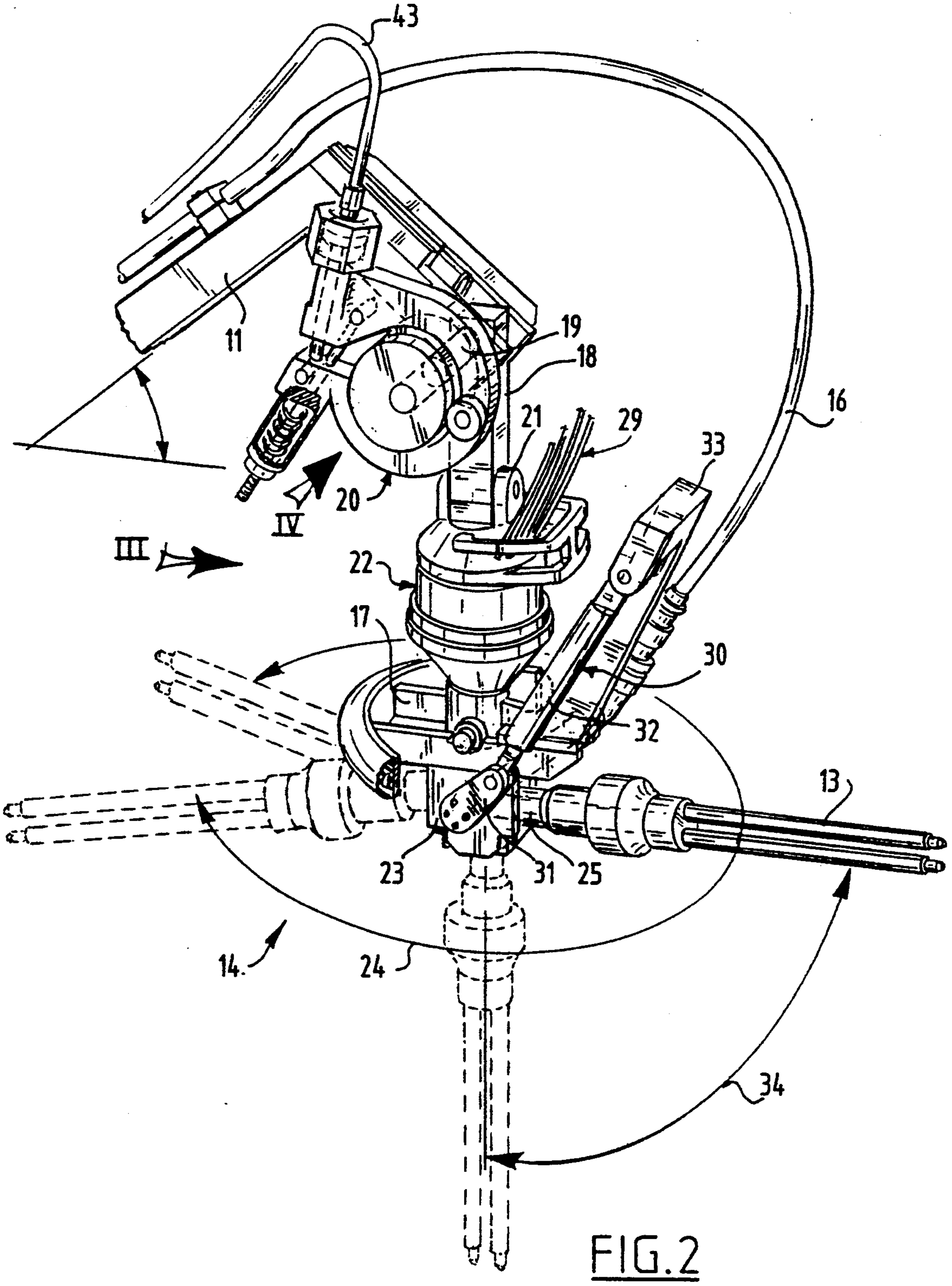
FIG. 2 shows on a larger scale a part of the device according to arrow II in FIG. 1.

As shown in FIG. 2, a connecting piece 18 is pivotally mounted on the end of slide member 11 of crane 2 by means of a shaft 19.

As will be further discussed with reference to FIG. 4, the pivoting movement on the shaft 19 is normally blocked by blocking means 20 and released by the appropriate control.

The connecting piece 18 adapts close-fittingly inside two oppositely placed ears 21 of a hydraulic rotator 22 such that rotator 22 is joined immovably with the connecting piece 18.

The hydraulic rotator 22 is a per se known hydraulic component which is typically used for rotatably connecting a grab or the like to a crane. The operation of rotator 22 is controlled by means of hydraulic conduits 29 while one or more passages for hydraulic conduits are likewise arranged in rotator 22.

As noted above, the rotator 22 is not, as is usual, mounted freely suspended from the crane using the ears 21 but immovably by means of connecting piece 18.

Mounted to the rotatable part of rotator 22 is a frame 17 which comprises on its bottom end two bearing plates 23 placed at a mutual distance. A jet member 25 is mounted between these bearing plates 23 for pivoting on a pivot axis transversely of the axis of rotation of rotator 22. Connected to the jet member 25 is an arm 31 which forms part of pivoting means 30. These pivoting means 30 further comprise a jack 32 which engages on arm 31 and which is hingedly connected with its other end to a support 33 fixedly connected to the frame 17. The control line for the hydraulic jack 32 can pass through the above mentioned channel passages of the rotator 22. By actuating the jack 32 the jet member 25 and the jet lance 13 connected thereto pivot through the angle designated with arrow 34.

The rotator 22 rotates the frame 17 with the jet member 25 on a vertical axis, as seen in FIG. 2, through practically 360° as designated with arrow 24. Due to the combination of the action of rotator 22 and the pivot means 30 the jet lance 13 can thus be placed in any desired position from horizontal to vertically downward and at any desired angle. It is evident that when the rotator is for instance supported vertically upward by the arm of the crane the jet lance can assume all directions from horizontal to vertically upward.

Figure 3:
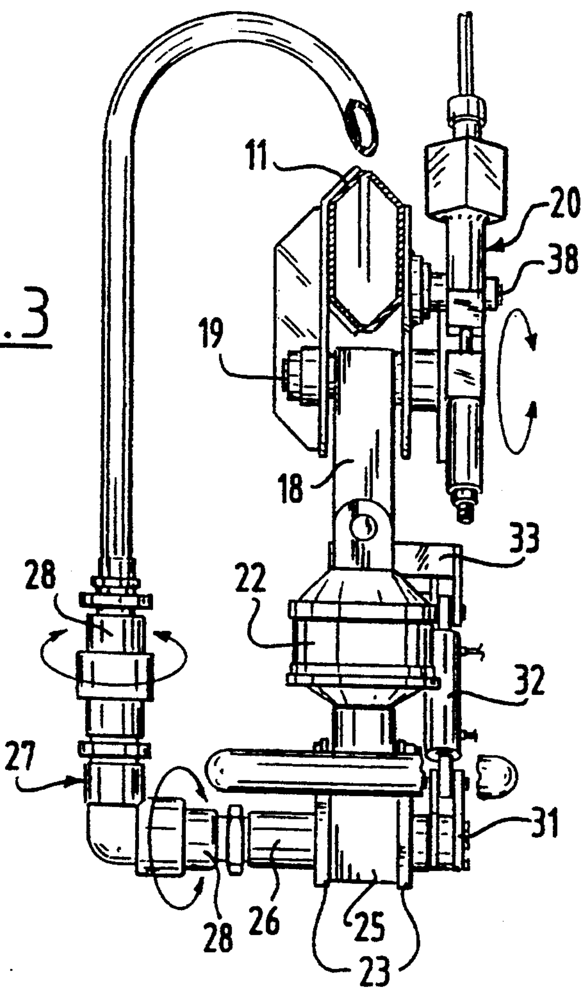
FIG. 3 shows a side view according to arrow III in FIG. 2.

As noted above, the feed of liquid under high pressure is provided via the high pressure hose 16. The liquid feed into the jet member 25 takes place, as shown in FIG. 3, via a feed connection 26 extending coaxially of the pivot axis of the jet lance. Connected to this feed channel 26 is a right-angled coupling device 27 comprising a rotatable coupling 28 on either end. The coupling device 27 hereby enables unimpeded turning movements in the direction of the arrows shown in FIG. 3. The high pressure hose is thereby protected against torsion forces and the bending load of this hose 16 is moreover minimalized. This is of great importance for the desired long useful life of high pressure hose 16.

Figure 4:
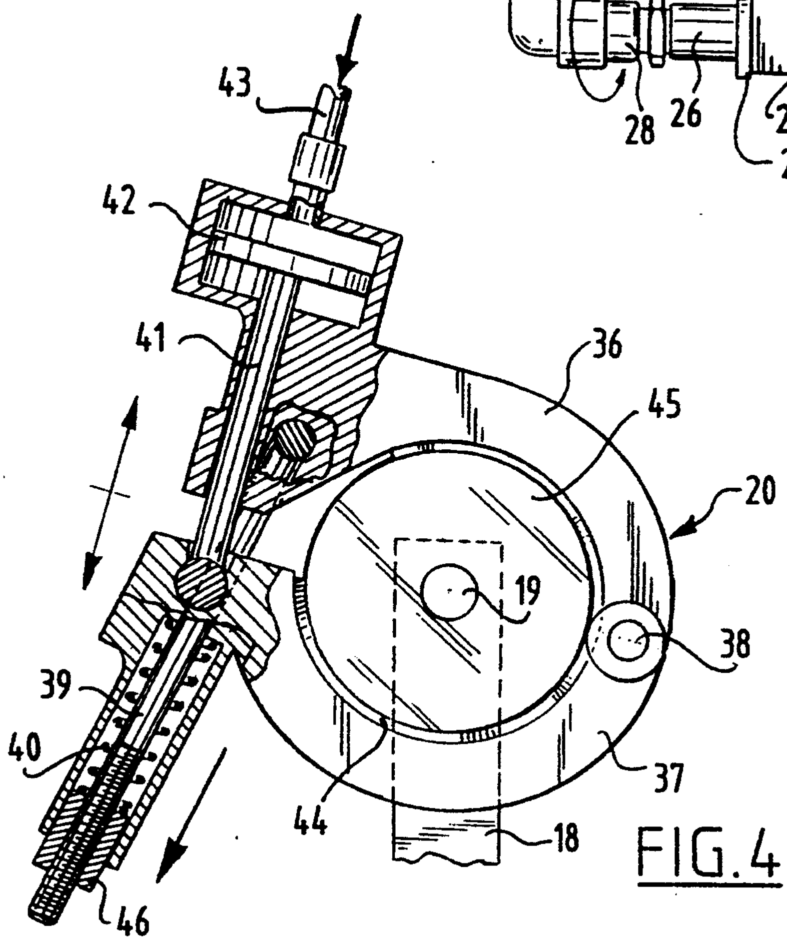
FIG. 4 shows a front view of a part of the device according to arrow IV in FIG. 2.

The blocking means which obstruct the free rotation of the connecting piece 18 on shaft 19 are shown in more detail in FIG. 4. In this embodiment the blocking means 20 consist of a strap brake. The shaft 19 is fixedly connected to connecting piece 18 and supports on its protruding end a circular brake disc 45. Engaging round this brake disc 45 is a brake caliper consisting of two caliper halves 36, 37 hingedly joined to each other at 38. The hinge pin 38 is fixedly connected to the slide member 11 of the crane arm. The two caliper halves 36, 37 are pulled toward each other by means of a spring 40 which lies with one end against a surface of the caliper half 37 and with its other end against a nut 46 arranged on a rod 39 engaging onto the other caliper half 36. A lining 44 is arranged along the inner surface of the caliper halves 36, 37. Due to the clamping force generated as a consequence of the spring 40, rotation of the disc 45 relative to the caliper 36, 37 is prevented and rotation of the shaft 19 relative to arm 11 thus obstructed.

Connected to caliper half 36 is a pneumatic cylinder whereof a piston rod 41 engages onto the second caliper half 37. When the piston 42 is loaded with compressed air via the feed 43 at the top as seen in FIG. 4, the piston rod 41 pushes the second caliper half 37 away from the first caliper half 36 whereby the blocking engagement of the lining 44 on disc 45 is discontinued.

By releasing the blocking means 20 by feeding compressed air to piston 42 the whole head piece 14 can swing on the shaft 19. This head piece 14 can hereby hang substantially vertically irrespective of the angle of deflection of crane arm 3. As soon as the crane arm is moved into the desired position the compressed air feed via conduit 43 is closed and head piece 14 again becomes immovably connected to the arm so that reaction forces occurring during operation of the jet lance 13 can be transmitted into the arm.

The control of crane arm 3, rotator 22, pivoting means 30 and blocking means 20 takes place in normal manner from a control position. This can be in fixed disposition in a cabin while a displaceable remote control unit can additionally be used. The control means are embodied such that when the feed of liquid under high pressure to jet lance 13 is switched on the blocking means 20 are held constrained in their blocking position, for instance because compressed air feed via conduit 43 is made impossible. Unexpected movements of the jet 15 generated by jet lance 13 are hereby prevented, as is the danger that would thereby occur.

The invention is not limited to the embodiment shown in the figures. As remarked above, any random hydraulic crane can be used. The choice of a suitable hydraulic crane depends of course on the range desired in a particular case of use. The swinging suspension, as achieved with shaft 19 and the blocking means 20 coacting therewith, is suitable when objects disposed on the ground must be approached from all sides. In an application wherein work must take place at a high level, such a suspension can in some cases be omitted and the rotator 22 can be fixedly connected directly to the arm.

I claim:

1. Jet lance device comprising a hydraulic crane with an articulated jib, said articulated jib having a plurality of rotatably connected arm parts movable by hydraulic motors whereby said arm parts rotate about horizontal rotational axes, said articulated jib having one end connected to the crane and a free end opposite the end connected to the crane, a hydraulic rotator mounted on said free end of said jib such that a rotatable support element thereof is turnable about a rotational axis extending vertically through said jib, and a jet member mounted on the support element, which jet member comprises a jet lance, and pivoting means connected to said jet lance for pivoting the jet lance on a pivot axis transversely of said rotational axis of the rotator and said jet lance connected to a source of jet liquid under high pressure, and wherein the device further comprises control and drive means for operating said jib, rotator, and pivoting means.

2. Device as claimed in claim 1, wherein the rotator is connected to the jib for pivoting on an axis transversely of the vertical plane through the jib, and blocking means connected to the jib and the rotator are arranged which in their active position obstruct the pivoting movement of the rotator relative to the jib.

3. Device as claimed in claim 2, wherein the blocking means are actuated by the control means and that these are embodied such that in the operating situation of the jet lance the blocking means are held constrained into their blocking position.

4. Device as claimed in claim 3, wherein the blocking means comprise a strap brake which is held in engagement by resilient means and which is held in released position counter to the force of the resilient means by a pressure cylinder in its loaded position.

5. Device as claimed in any of the foregoing claims wherein said jet lance pivots on a pivot axis and wherein said jet member comprises a feed channel extending coaxially with said pivot axis of said jet lance, to which a high pressure hose arranged along the jib is connected by a right-angle coupling device, wherein the coupling device is embodied rotatably with both the feed channel and said hose.

* * * * *